Aug. 25, 1970 — L. LEE II — 3,525,453
SEALING PLUG ASSEMBLY
Filed Nov. 7, 1968

INVENTOR
LEIGHTON LEE II
BY Lindsey, Prutzman and Hayes
ATTORNEYS

# United States Patent Office 3,525,453
Patented Aug. 25, 1970

3,525,453
SEALING PLUG ASSEMBLY
Leighton Lee II, Guilford, Conn., assignor to The Lee Company, Westbrook, Conn., a corporation of Connecticut
Filed Nov. 7, 1968, Ser. No. 774,134
Int. Cl. B65d 39/12
U.S. Cl. 220—24.5                              5 Claims

ABSTRACT OF THE DISCLOSURE

An expandable plug slip-fitted in an access hole of a base member and disposed axially inwardly of an annular groove surrounding the hole, an expander pin force-fitted into a socket of the plug causing peripheral ring sealing means thereon to bite into the base member, and an auxiliary locking ring compressively filling the groove and in contact with an outer axial end of the plug providing a secondary retainer of increased shear strength.

---

This invention relates to an improved plug assembly for sealing an access hole formed, e.g., in a metal casting and particularly concerns sealing plug assemblies of a general type disclosed in my U.S. Pat. No. 2,821,323 issued Jan. 28, 1958 and entitled "Pin Plug," this patent being assigned to the assignee of the present invention.

A primary object of this invention is to provide an improved sealing plug assembly incorporating a novel auxiliary retainer construction.

Another object of this invention is to provide an improved sealing plug assembly of the above described type which is economical to manufacture, quick and easy to install and which provides significantly increased shear strength for positively locking the plug in assembled position.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figures 1, 2, 3:
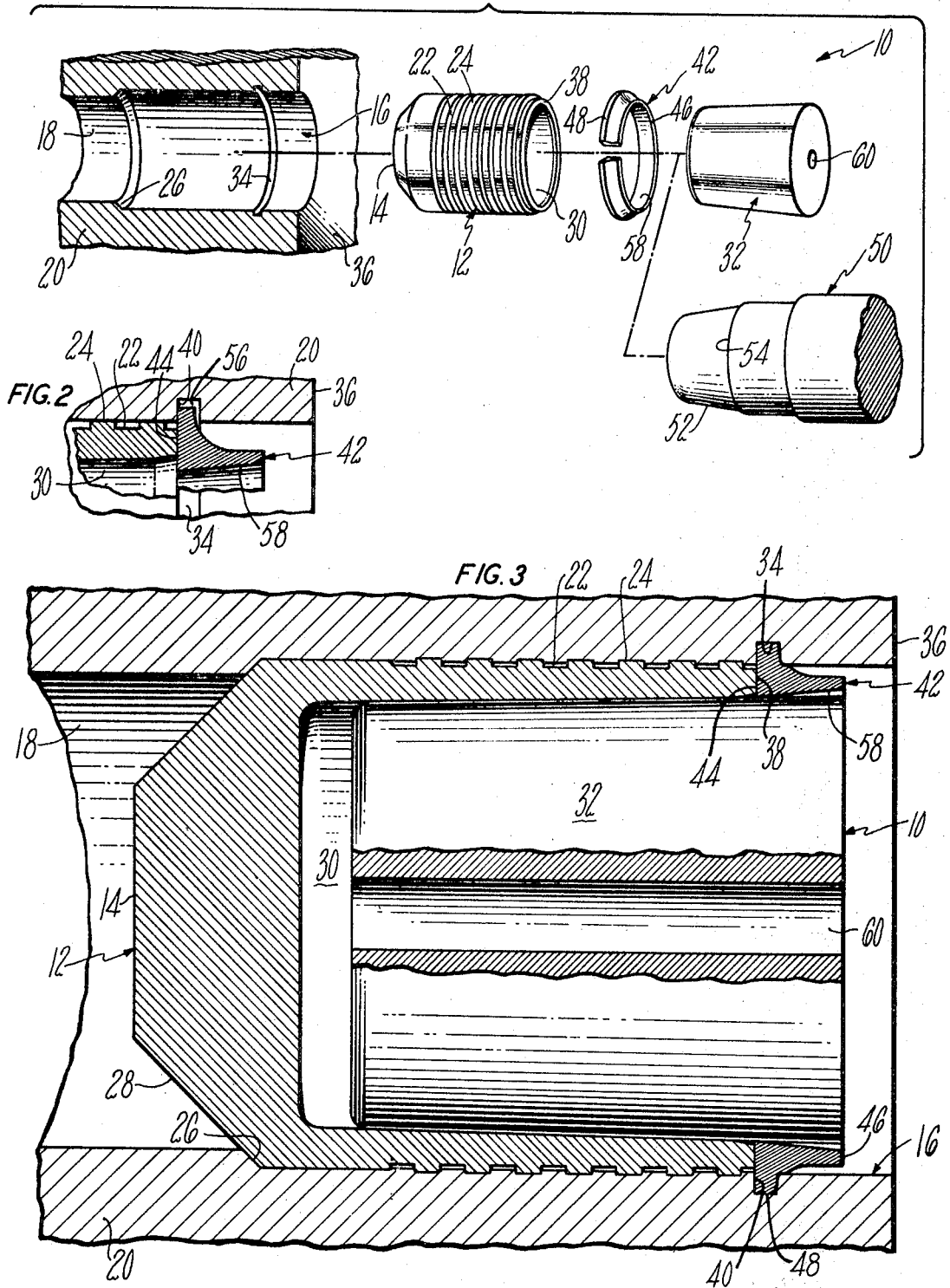
FIG. 1 is an exploded isometric view showing a preferred embodiment of a sealing plug assembly incorporating this invention, together with a portion of a tool securing the plug assembly within an aperture base member shown partly in section and partly broken away.
FIG. 2 is an enlarged section view showing a portion of the plug assembly in position before being expanded.
FIG. 3 is an enlarged side view, partly broken away and partly in section, showing the expanded plug assembly secured in the base member.

Referring to the drawing in detail, a sealing plug assembly 10 is shown of a general known type disclosed in my aforementioned patent. A tubular plug 12 is provided having a closed inner end 14 for sealing an access hole 16 of a passageway 18 formed in a base member 20 such as a die cast member, forging and the like. The plug 12 is preferably formed of a suitable metal and has an external peripheral surface provided with a series of spaced grooves 22 in nonintersecting parallel relation defining therebetween a plurality of external sealing rings or lands 24 formed about the plug 12. The plug 12 is suitably dimensioned to slip-fit into the access hole 16 to an extent limited by a chamfer 26 formed, e.g., by a counterbore and which provides a seat for an inclined shoulder 28 on the inner end 14 of the plug 12.

The plug 12 also has a frusto-conical socket 30 with a larger diameter portion of the outer end of the plug 12 for receiving an expander pin 32. The pin 32 is tapered to substantially correspond with the taper of the socket 30, but the pin 32 is diametrically dimensioned a predetermined amount larger than the socket 30 to effect a controlled, uniform radial expansion of the plug 12 upon driving the pin 32 into the socket 30 to embed the lands 24 into compressive engagement with the base member 20 which will be understood to be of somewhat softer material than that of the plug 12.

The access hole 16 of the base member 20 communicates with a surrounding concentric annular groove 34 formed near an outer surface 36 of the base member 20. The plug 12 is of preselected length such that the plug in its entirety will be disposed axially inwardly of the annular groove 34 when bottomed against the chamfer 26 with an outer axial end 38 of the plug 12 in substantially radial alignment with an inner radial wall 40 of the groove 34 when the plug 12 is positioned in the hole 16.

To provide significantly increased protection against plug blow-out, e.g., under extremely high pressure conditions in the passageway 18, while at the same time assuring that the access hole 16 can be effectively sealed in a simplified operation requiring a minimal amount of skill, secondary retaining means are provided in accordance with this invention to ensure an exceptionally effective plug assembly exhibiting increased resistance to loading under rugged operating conditions.

More specifically, a split locking ring 42 is inserted into the groove 34 with a radially extending inner contact face 44 directly engaging the outer axial end 38 of the plug 12. As best seen in FIG. 2, the locking ring 42 has a cross section which gradually increases in thickness from an outer axial end 46 toward the contact face 44 which is of maximum radial dimension to define a peripheral rim portion 48 received within the annular groove 34 surrounding the access hole 16. The locking ring 42 is readily inserted in the groove 34, for the initial cross-sectional size of the rim portion 48 is less than that of the groove 34. The locking ring 42 is formed of a strong albeit ductile material such as stainless steel suited to be expanded, e.g., by a swaging tool 50. The latter is preferably provided with a tapered head 52 and a shoulder 54 which serves as a stop upon effecting a predetermined amount of expansion of the locking ring 42 to compressively fill any voids such as shown at 56 in FIG. 2 between the rim portion 48 and the annular groove 34 upon completion of the swaging operation. To ensure a relatively large bearing area for an effective swaging operation, the locking ring 42 has an internal generally cylindrical wall surface 58 of greater dimension than that of its plug engaging face 44, and the internal wall surface 58 is preferably outwardly tapered to mate with the taper of the head 52 of the swaging tool.

Upon completion of the swaging operation the expander pin 32, which preferably has a vent hole 60, is then forcibly driven home into the socket 30 of the plug 12, preferably to an extent flush with the outer axial end 46 of the expander locking ring 42 to cause the plug 12 to be radially expanded, as previously described, to force the lands 24 into compressive biting engagement with the base member.

It will be noted that the expander pin 32 is of sufficient diametrical size and axial length to preclude any possibility of the locking ring 42 contracting from a radially expanded locking position within the groove 34, such that the plug 12 will be positively locked against outward axial displacement.

The locking ring 42 is of sufficient radial dimension to extend across the full radial extent of the outer axial end 38 of the plug 12 in surface-to-surface abutment therewith. In effect, the increased positive locking action provided by the ring 42 requires that the internal pressure within the passageway 18 would have to be increased to an extent sufficient to actually shear that portion of the ring 42 extending across the full axial length of the groove 34.

A sealing plug assembly constructed in accordance with this invention not only provides for integral external peripheral sealing of the outer wall of the plug along a substantial axial length of the plug to resist any forces tending to displace the plug, but also positively locks the plug against blow-out under extremely high pressure conditions. Moreover, such advantageous features are incorporated in an assembly which is relatively economical to manufacture and is particularly suited for quick and easy installation in applications having fail-safe requirements.

As will be apparent to persons skilled in the art, various modifications, adaptations and variations of the foregoing specific disclosure can be made without departing from the teachings of the present invention.

I claim:

1. A sealing plug assembly comprising a base member having an opening and an internal annular groove surrounding the opening in concentric relation therewith, an expandable plug in the opening and having an outwardly opening socket and an outer axial end disposed adjacent the groove such that the plug in its entirety is located in the opening axially inwardly of the groove, the plug having an external peripheral surface with spaced annular recesses therein providing external sealing ring means therebetween, an auxiliary locking ring having a plug engaging radial face and a deformable peripheral rim portion received within the groove, the rim portion having a cross-sectional profile initially of smaller size than that of the groove, the auxiliary locking ring having an internal wall surface of greater dimension than that of its plug engaging radial face to provide a relatively large bearing area for swaging the locking ring and causing its rim portion to cold flow into the groove surrounding the opening, the rim portion of the locking ring being in compressive engagement with the base member upon radial expansion of the locking ring to compressively fill voids within the groove and provide increased shear strength, and an expander pin in the socket of the plug configured and dimensioned relative to the socket to provide a controlled radial expansion of the plug upon driving the pin into the same, the sealing ring means being compressively embedded in intimate engagement with the base member.

2. The sealing plug assembly of claim 1 wherein the opening of the base member is provided with a cylindrical counterbore defining a chamfered surface, and wherein the plug includes an inner end portion seated on the chamfered surface of the counterbore, the plug being of a predetermined length such that the outer axial end of the plug is substantially flush with an inner radial wall of the groove surrounding the opening upon bottoming the plug therein.

3. The sealing plug assembly of claim 1 wherein the expander pin has an outer end driven flush with an outer end of the auxiliary locking ring in outwardly axially spaced relation to the outer end of the plug.

4. The sealing plug assembly of claim 1 wherein the plug engaging face of the auxiliary locking ring is of sufficient radial dimension to extend across the full radial extent of the outer axial end of the plug in engagement therewith.

5. A sealing plug subassembly for use in closing an opening of a base member having an annular groove formed therein surrounding the opening in concentric relation thereto, the sealing plug subassembly comprising a generally tubular plug having a closed inner end and an outwardly opening socket, said plug having a cylindrical outer wall interrupted by a plurality of grooves defining therebetween base member engaging sealing ring means, an expander pin force-fitted into said socket for embedding said sealing ring means into the base member, and an auxiliary locking ring having a plug engaging radial face terminating in a rim portion, the rim portion being permanently deformable for filling the groove of the base member in compressive engagement therewith such that the locking ring must be sheared to permit plug blow-out.

References Cited
UNITED STATES PATENTS 2,821,323   1/1958   Lee ---------------- 220—24.5
3,104,905   9/1963   Erdmann et al. ------ 220—55

GEORGE T. HALL, Primary Examiner

U.S. Cl. X.R.

220—55